United States Patent
Kim et al.

(10) Patent No.: US 7,894,554 B2
(45) Date of Patent: Feb. 22, 2011

(54) APPARATUS FOR PERFORMING INITIAL SYNCHRONIZATION AND FRAME SYNCHRONIZATION IN MOBILE COMMUNICATIONS SYSTEM AND METHOD THEREOF

(75) Inventors: Nam Hoon Kim, Gyeonggi-do (KR); Yong Bae Park, Incheon (KR)

(73) Assignee: LG Electronics Inc., Seoul (KR)

( * ) Notice: Subject to any disclaimer, the term of this patent is extended or adjusted under 35 U.S.C. 154(b) by 1126 days.

(21) Appl. No.: 11/554,494

(22) Filed: Oct. 30, 2006

(65) Prior Publication Data

US 2007/0098116 A1    May 3, 2007

(30) Foreign Application Priority Data

Oct. 31, 2005    (KR) ............... 10-2005-0103509
Jan. 20, 2006    (KR) ............... 10-2006-0006428

(51) Int. Cl.
*H03D 1/00* (2006.01)
(52) U.S. Cl. .................................... 375/343
(58) Field of Classification Search ................ 375/316, 375/340, 343, 354; 455/403, 422.1, 434, 455/446, 449; 370/503
See application file for complete search history.

(56) References Cited

U.S. PATENT DOCUMENTS

| | | | | |
|---|---|---|---|---|
| 5,299,148 A | * | 3/1994 | Gardner et al. | 702/196 |
| 5,463,627 A | * | 10/1995 | Matsuoka et al. | 370/350 |
| 6,748,026 B1 | * | 6/2004 | Murakami et al. | 375/316 |
| 2002/0159531 A1 | * | 10/2002 | Reagan et al. | 375/260 |
| 2003/0181183 A1 | * | 9/2003 | Ventura | 455/258 |

FOREIGN PATENT DOCUMENTS

WO    WO 2005053258 A2    *    6/2005

* cited by examiner

*Primary Examiner*—David C Payne
*Assistant Examiner*—Vineeta S Panwalkar
(74) *Attorney, Agent, or Firm*—Lee, Hong, Degerman, Kang & Waimey

(57) ABSTRACT

An apparatus for performing initial synchronization and frame synchronization in a mobile communications system and method thereof are disclosed. First of all, a method and apparatus for performing frame synchronization in a mobile communications system using a correlation value between a received signal and a reference vector for a phase according to one embodiment of the present invention are disclosed. Secondly, a method and apparatus for performing frame synchronization by considering all phase modulation possibility and frequency offsets according to another embodiment of the present invention are disclosed. Thirdly, a method and apparatus for performing initial estimation in a manner of dividing at least one subframe received from a base station by a UE in the course of cell search into at least two areas, calculating a correlation for each of the at least two areas and using a maximum value of the calculated correlation value per area are disclosed.

6 Claims, 16 Drawing Sheets

APPARATUS FOR PERFORMING INITIAL SYNCHRONIZATION AND FRAME SYNCHRONIZATION IN MOBILE COMMUNICATIONS SYSTEM AND METHOD THEREOF

CROSS REFERENCE TO RELATED APPLICATIONS

This application claims the benefit of the Korean Patent Application Nos. P10-2005-0103509 filed on Oct. 31, 2005, and P10-2006-0006428 filed on Jan. 20, 2006, which are hereby incorporated by reference as if fully set forth herein.

BACKGROUND OF THE INVENTION

1. Field of the Invention

The present invention relates to a mobile communications system, and more particularly, to an apparatus for performing initial synchronization and frame synchronization in a mobile communications system and method thereof.

2. Discussion of the Related Art

Generally, a cell search process by a user equipment (hereinafter abbreviated UE) in a TD-SCDMA system is a process for obtaining downlink synchronization code (SYNC-DL), basic midamble code, scrambling code, frame synchronization, BCH (broadcast channel) information, chip timing information and the like. And, the cell search process is carried out by the following 4-step procedures in general.

FIG. 1 is a flowchart of a cell search process according to a related art.

1) Initial Synchronization Search Procedure (Search for DwPTS)

First of all, a UE performs initial synchronization in DwPTS (downlink pilot time slot) using thirty-two available SYNC-DL codes without information for a cell to be searched for. Through this procedure, the UE should find the SYNC-DL code used in the cell among the thirty-two available SYNC-DL codes and a timing synchronization point.

2) Basic Midamble and Scrambling Code Identification

Since the DwPTS code found by the above initial synchronization search procedure corresponds to one code group having four basic midambles, the UE searches for a basic midamble in use within the cell from the four basic midambles. Because the basic midamble is associated with a scrambling code, the scrambling code can be found if the basic midamble is obtained.

3) Frame Synchronization Acquisition (Control Multi-Frame Synchronization)

The UE searches for MIB (master information blocks) of BCH multi-frame by QPSK phase modulation of DwPTS for P_CCPCH midamble.

4) BCH Information Acquisition (Read the BCH)

The UE acquires BCH information by reading the BCH using the searched MIB.

A frame synchronization acquisition process according to a related art is explained in detail as follows.

First of all, since BCH in TD-SCDMA system has 20 ms transmission time interval (hereinafter abbreviated as TTI), a UE has to know whether or not BCH exists in a next frame and a position where the 20 ms TTI starts.

In order to inform the UE of a start position of BCH, a base station performs phase modulation based on a phase of a first timeslot midamble in case of modulating DwPCH. And, a value of the phase modulation is identically sustained during one subframe.

Four phase modulation values obtained during four consecutive subframes referred to as a 'Phase Quadruple' and there are two kinds of phase quadruples, S1 and S2. Table 1 shows meanings of the two kinds of phase quadruples. In Table 1, P-CCPCH (primary-common control physical channel) is a physical channel to which a transport channel BCH is mapped.

| Case | Phase Quadruple | Meaning |
| --- | --- | --- |
| S1 | 135°, 45°, 225°, 135° | P-CCPCH exists in next four subframes |
| S2 | 315°, 225°, 315°, 45° | P-CCPCH does not exist in next four subframes |

In the related art, 'Phase Quadruple' is detected during four subframes, and it is then decided whether the detected phase quadruple corresponds to S1. If it is decided as S1, it is decided that there exists P-CCPCH from a next subframe. Reception of BCH transmitted via P-CCPCH is then initiated.

In particular, a process for detecting the phase quadruple includes a procedure for detecting a phase modulation value of a downlink synchronization code for each subframe, which consists of the following steps.

First of all, a phase value of a received midamble code and a phase value of a downlink synchronization code are detected.

Subsequently, correlation between the detected phase values of the two codes is obtained. By taking 'arctangent' on the obtained correlation, a modulated phase of the downlink synchronization code is then found.

Thereafter, the phase quadruple, which is the phase value modulated during the four subframes obtained in the above manner, is compared to the phase value S1 or S2 in Table 1.

As a result of the comparison, if the obtained phase quadruple corresponds to the S1, BCH is received in next four subframes. If the obtained phase quadruple does not correspond to the S1, it is decided that BCH does not exist in next four subframes. So, the process for detecting the phase quadruple is repeatedly executed.

Yet, in case that the modulated phase value of the downlink synchronization code is detected using the 'arctangent according to the related art, the arctangent operation is replaced by a table mapping using a lookup table for efficient implementation in general. So, since sufficient amount of table values need to be stored in a prescribed memory for accurate operations, a memory capacity should be excessively increased.

And, since the modulated phase value of the downlink code can be distorted by a frequency offset as well, it is difficult to calculate an accurate phase modulation value by the related art method.

The first procedure of initial synchronization search in the cell search process may have an effect on power consumption, automatic frequency control (AFC), synchronization tracker performance and the like. In addition, because the initial synchronization search should be repeatedly executed many times, it is required to satisfy excessive calculations and memory.

Generally, a downlink synchronization code (SYNC-DL) currently used by a current cell is detected through correlation between a signal received from a base station and a reference signal. In the 3GPP TDD LCR (low chip rate) system, a method of performing initial synchronization from a received signal includes one of the following schemes.

First of all, there is a method using a maximum value of correlation. In particular, initial synchronization is performed by finding a maximum value using correlation from one received subframe. So, the method can be easily implemented.

Yet, since a level of a received signal is rapidly varied in a multi-path fading channel environment with low SNR, it is difficult to improve performance of temporal correlation. Moreover, in case of reducing the sampling occurrences of received signals, a timing error increases.

Secondly, there is another method using an average calculated by accumulating correlation values through several subframes. In particular, correlation between a signal received from a base station and a downlink synchronization code (SYNC-DL) is obtained. The correlations are accumulated through several subframes and averages are then obtained. And, the initialization synchronization is performed by searching the averages for a biggest value.

If a maximum value is found by obtaining averages resulting from accumulating correlations through several subframes, it is able to obtain a reliable timing correlation by reducing a level variation of a received signal due to an effect of high fading frequency. Yet, since the correlations for thirty-two codes received through several subframes should be stored each time, the memory increase is inevitable. And, in case of over-sampling the received signals and a comparator for finding sequentially a maximum correlation is implemented, comparisons and storages should be repeatedly conducted as many as [6400×32×over-sampling].

Moreover, since it is unable to set a number of subframes to an infinite number, it is restricted to a prescribed number. So, if an average is taken despite that error values of correlations considerably distorted by noise are accumulated, degradation of performance is inevitable.

Thirdly, there is another method using tracking a synchronization code having a high occurrence number and a synchronization point thereof for several subframes. Considering probability decided through several subframes, an occurrence number having a maximum correlation in an original code is high. So, erroneous correlations are removed using the occurrence frequency and an average is obtained with remaining strong timing candidates.

If only an index of a code having a biggest correlation value for one subframe and the correlations value are stored, it is able to considerably reduce a memory size necessary for one subframe. However, sufficient amount of subframes should be observed in order to track a code having a high occurrence number for several subframes and a synchronization point. If less subframes are observed, accuracy is lowered.

Moreover, if a channel environment is poor, it is unable to find an accurate downlink synchronization code. So, more subframes need to be observed. If not, the accuracy is considerably lowered.

SUMMARY OF THE INVENTION

Accordingly, the present invention is directed to an apparatus for performing initial synchronization and frame synchronization in a mobile communications system and method thereof that substantially obviate one or more problems due to limitations and disadvantages of the related art.

An object of the present invention is to provide an apparatus for performing frame synchronization in a mobile communications system and method thereof, by which frame synchronization is possible without increasing excessive memory.

Another object of the present invention is to provide an apparatus for performing frame synchronization and method thereof, by which detection error generated due to a frequency offset can be corrected.

Another object of the present invention is to provide an apparatus for performing initial synchronization and method thereof, by which a memory requirement amount can be considerably reduced.

A further object of the present invention is to provide an apparatus for performing initial synchronization and method thereof, by which initial synchronization having high reliability can be performed with a small number of frames received by a UE.

First of all, a method and apparatus for performing frame synchronization in a mobile communications system using a correlation value between a received signal and a reference vector for a phase according to one embodiment of the present invention are disclosed.

Secondly, a method and apparatus for performing frame synchronization by considering all phase modulation possibilities and frequency offsets according to another embodiment of the present invention are disclosed.

Thirdly, a method and apparatus for performing initial synchronization in a manner of dividing at least one subframe received from a base station by a UE in the course of cell search into at least two areas, calculating a correlation for each of the at least two areas and using a maximum value of the calculated correlation value per area are disclosed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of performing downlink frame synchronization in a mobile terminal of a mobile communication system according to the present invention includes the steps of obtaining a phase shift between a downlink synchronization code and a midamble code included in each of M number of consecutive subframes received from a base station, calculating a complex inner product between a reference vector representing M number of reference phase values and a phase vector representing the obtained M number of the phase shift values, and estimating frame synchronization using the calculated complex inner product.

Preferably, the method further includes the step of estimating a frequency offset between the base station and the mobile terminal, wherein the calculated complex inner product is differently used according to the frequency offset.

In another aspect of the present invention, an apparatus for performing frame synchronization in a mobile communication system includes a phase detection module obtaining a phase shift between a downlink synchronization code and a midamble code included in a subframe, an inner product calculation module calculating a complex inner product between a reference vector representing M number of reference phase values and a phase vector representing M number of phase shift values obtained for each of M number of consecutive subframes by the phase detection module, and a frame synchronization detection module performing the frame synchronization using the calculated complex inner product.

Preferably, the apparatus further includes a frequency offset detection module detecting a frequency offset between the base station and the mobile terminal, wherein the calculated complex inner product is differently used according to the detected frequency offset.

In another aspect of the present invention, a method of performing initial synchronization in a mobile terminal of a mobile communication system includes the steps of calculating a maximum correlation value for each region of at least one or more subframes received from a base station with a plurality of synchronization codes, each sub-frame divided into at least two regions and performing the initial synchronization using the calculated maximum correlation value for each of the at least two regions of each of the at least one or more sub-frames.

Preferably, the step of performing the initial synchronization includes the steps of combining the maximum correlation values for at least two subframes for each region and for each synchronization code and obtaining the index of the synchronization code and the timing synchronization point for the initial synchronization by selecting a region having the maximum value among the combined values of the maximum correlation values.

In another aspect of the present invention, a method of performing initial synchronization in a mobile terminal of a mobile communication system includes a first step of calculating a maximum correlation value for each region of a subframe received from a base station with a plurality of synchronization codes, the sub-frame divided into at least two regions, a second step of combining the maximum correlation values per the each region and per a downlink synchronization code by performing the first step on at least two subframes repeatedly, and a third step of performing the initial synchronization using the combined values.

In another aspect of the present invention, an apparatus for performing initial synchronization in a mobile communication system includes a means for calculating a maximum correlation value for each region of at least one or more subframes received from a base station with a plurality of synchronization codes, each the at least one sub-frame divided into at least two regions, a means for combining maximum correlation values for the at least one or more subframes per each region and per each synchronization code, and a means for performing the initial synchronization using the combined values.

Preferably, the apparatus further includes a memory means for storing the combined value of the maximum correlation values per the region and per the downlink synchronization code and an index of a point having the maximum correlation value per the subframe, per the region or per the downlink synchronization code.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, in the fowling embodiments of the present invention, the technical features of the present invention are applied to the 3GPP TDD LCR (TD-SCDMA) system. And, the following embodiments are just exemplary and the technical features of the present invention are applicable to other kinds of mobile communications systems as well.

Figure 1:
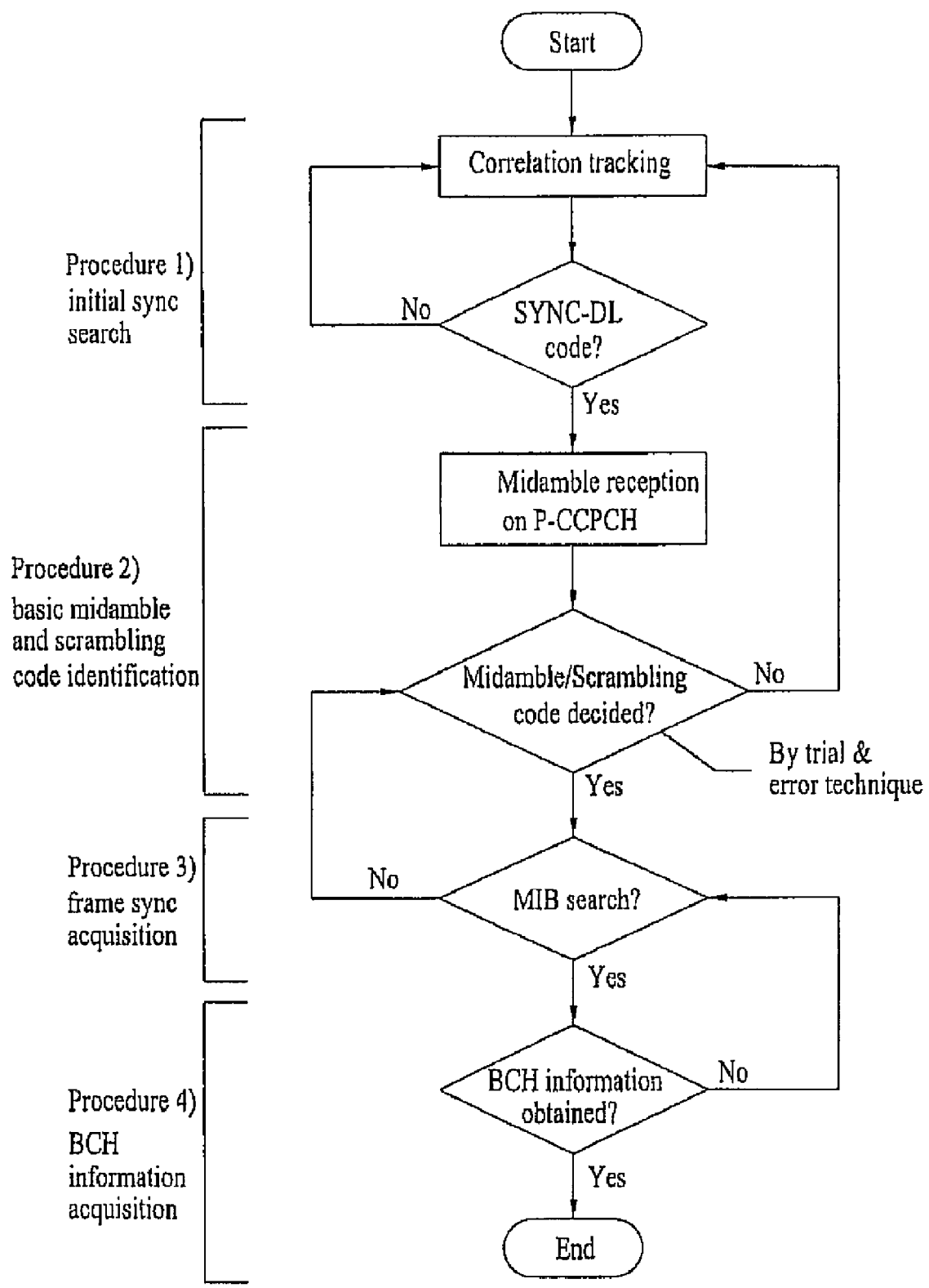
FIG. 1 is a flowchart of a cell search process according to a related art.
Figure 2:
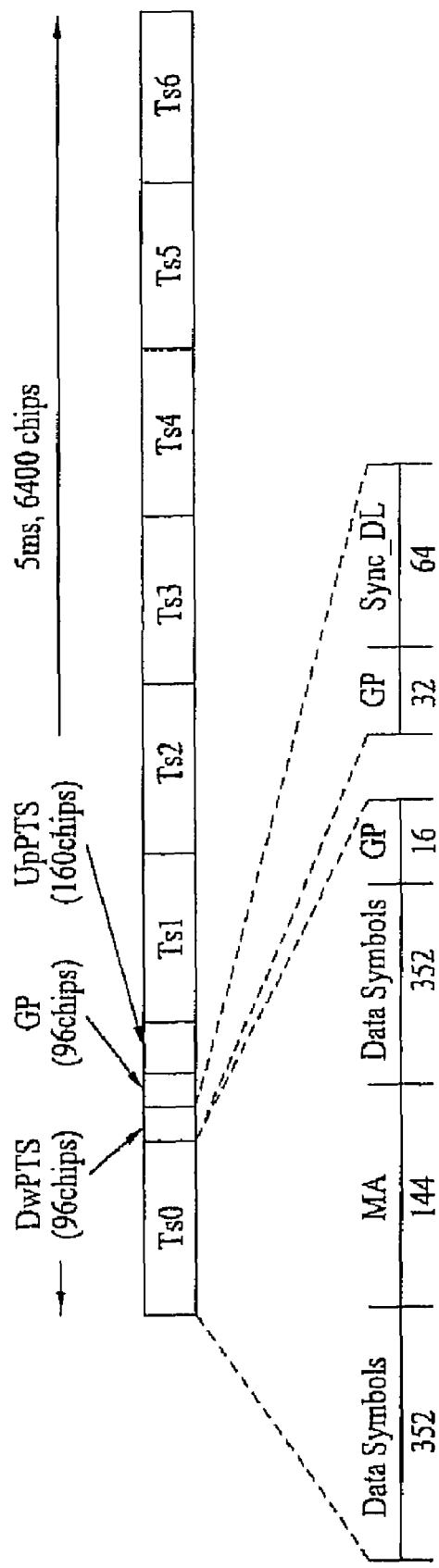
FIG. 2 is a diagram of a format of downlink subframe in 3GPP TDD LCR system.

FIG. 2 is a diagram of a format of downlink subframe in 3GPP TDD LCR system. There are 32 kinds of reference signals SYNC-DL of a downlink synchronization code in the 3GPP TFF LCR system. And, a length per code corresponds to 64 chips. Referring to FIG. 2, a midamble code (MA) of P-CCPCH is included in a first downlink time slot Ts0 and a downlink synchronization code SYNC-DL is located next to the first downlink time slot Ts0 of a subframe. 'DwPTS' includes a 32-chip guard period and a 64-chip SYNC-DL code. And, the SYNC-DL code is used by selecting one of the 32 kinds for each cell.

Figure 3:
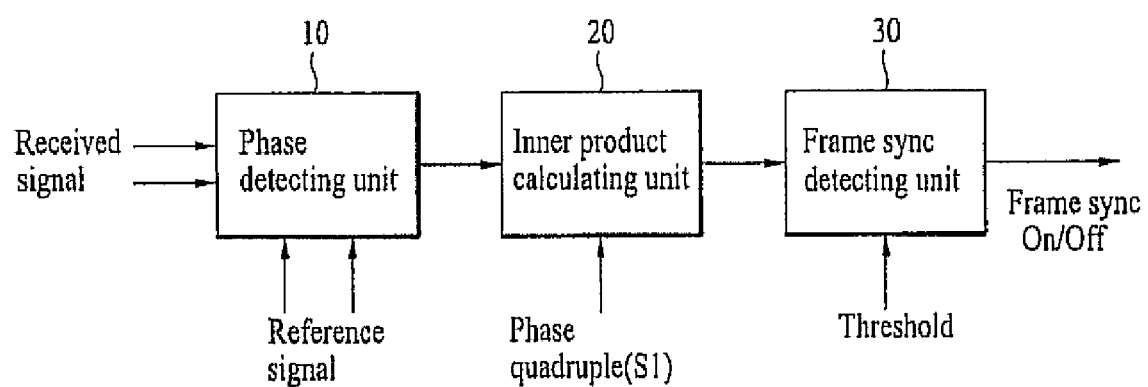
FIG. 3 is a block diagram of an apparatus for performing frame synchronization according to one embodiment of the present invention.

FIG. 3 is a block diagram of an apparatus for performing frame synchronization according to one embodiment of the present invention.

Referring to FIG. 3, an apparatus for performing frame synchronization according to one embodiment of the present invention includes a phase detecting unit 10 obtaining a phase shift between a midamble code (MA) included in each subframe and a downlink synchronization code (SYNC DL code) from a received signal transmitted from a base station using a reference signal, an inner product calculating unit 20 calculating a complex inner product of a phase vector as a vector expression for the phase shifts obtained for four consecutive subframes by the phase detecting unit 10, and a frame synchronization detecting unit 30 detecting frame synchronization using the calculated inner product value.

Figure 4:
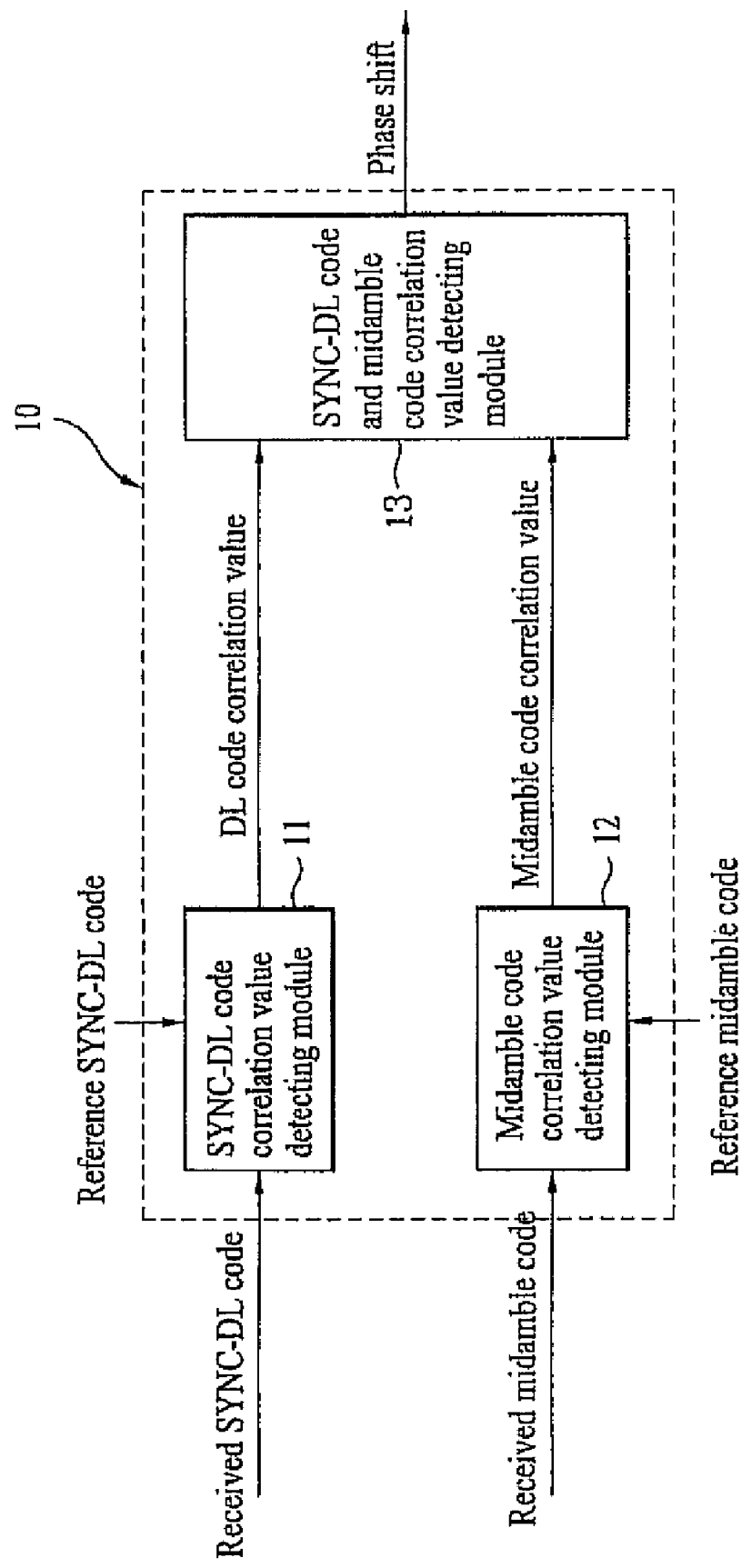
FIG. 4 and FIG. 5 are detailed block diagrams of a phase detecting unit and an inner product calculating unit shown in FIG. 3, respectively.

FIG. 4 is a detailed block diagram of the phase detecting unit 10.

Based on a phase of a midamble code (MA) included in a first downlink timeslot Ts0 of each subframe transmitted from a base station, a process for finding a phase modulation value of a downlink synchronization code (SYNC DL code), i.e., a phase shift between the downlink synchronization code and the midamble code is explained in detail with reference to FIG. 4 as follows.

First of all, if a downlink synchronization code of a received signal in an $n^{th}$ subframe is represented as $r_s^{(n)} = [r_{s,0}^{(n)}, \ldots, r_{s,63}^{(n)}]^T$, if a midamble code of the received signal is represented as $r_m^{(n)} = [r_{m,0}^{(n)}, \ldots, r_{m,127}^{(n)}]^T$, if a downlink synchronization signal of a reference signal previously known by a UE is represented as $s = [s_0, \ldots, s_{63}]^T$, and if a midamble code of the reference signal is represented as $m = [m_0, \ldots, m_{127}]^T$, an $i^{th}$ downlink synchronization code and midamble code of the received signal can be defined by Equation 1 and Equation 2, respectively.

$$r_{s,i}^{(n)} = \sum_{l=0}^{L-1} h_l \cdot s_{i-l} \cdot e^{j\phi_n} + \eta_i \ (i = 0, \ldots, 63) \quad [\text{Equation 1}]$$

$$r_{m,i}^{(n)} = \sum_{l=0}^{L-1} h_l \cdot m_{i-l} + \eta_i \ (i = 0, \ldots, 127) \quad [\text{Equation 2}]$$

In this case, 'L' indicates a length of a multi-path channel (unit of chip), '$\phi_n$' indicates a downlink phase modulation value of an $n^{th}$ subframe, '$\eta_i$' indicates a noise component, and '$h_i$' indicates a channel coefficient indicating a channel component.

In order to extract a channel component and a phase modulation component, a downlink synchronization code correlation value detecting module 11 and a midamble code correlation value detecting module 12 find auto-correlations between received signals $r_s^{(n)}$, $r_m^{(n)}$ and reference signals s, m, respectively. This is expressed by the following Equation 3 and Equation 4. In this case, '$h_0$' is a channel component when synchronization is exactly matched. And, according to the auto-correlation and the cross-correlation property of s, m, it can be assumed that $\tilde{N}_s$ and $\tilde{N}_m$ are negligibly small values, respectively.

$$c_s^{(n)} = \frac{1}{64}(r_s^{(n)})^T \cdot s^* = \frac{1}{64}\sum_{i=0}^{63} r_{s,i}^{(n)} \cdot s_i^* = \frac{1}{64}\sum_{i=0}^{63} \quad [\text{Equation 3}]$$

$$\left(\sum_{l=0}^{L-1} h_l \cdot s_{i-l} \cdot e^{j\phi_n} + \eta_i\right) \cdot s_i^*$$

$$= \sum_{l=0}^{L-1} h_l \cdot e^{j\phi_n} \left(\frac{1}{64}\sum_{i=0}^{63} s_{i-l} \cdot s_i^*\right) + \frac{1}{64}\sum_{i=0}^{63} \eta_i \cdot s_i^*$$

$$= h_0 \cdot e^{j\phi_n} + \sum_{l=1}^{L-1} h_l \cdot e^{j\phi_n} \left(\frac{1}{64}\sum_{i=0}^{63} s_{i-l} \cdot s_i^*\right) + \frac{1}{64}\sum_{i=0}^{63} \eta_i \cdot s_i^*$$

$$h_0 \cdot e^{j\phi_n} + \tilde{N}_s$$

$$c_m^{(n)} = \frac{1}{128}(r_m^{(n)})^T \cdot m^* = h_0 + \tilde{N}_m \quad [\text{Equation 4}]$$

If auto-correlation values $c_s^{(n)}$, $c_m^{(n)}$ found by Equation 3 and Equation 4 are normalized to eliminate a channel component varying each subframe, Equation 5 and Equation 6 are generated.

$$\tilde{c}_s^{(n)} = \frac{c_s^{(n)}}{|c_s^{(n)}|} \quad [\text{Equation 5}]$$

$$\tilde{c}_m^{(n)} = \frac{c_m^{(n)}}{|c_m^{(n)}|} \quad [\text{Equation 6}]$$

In this case, the normalizations for $c_s^{(n)}$, $c_m^{(n)}$ can be performed by the downlink synchronization code correlation value detecting module 11 and the midamble code correlation value detecting module 12, respectively or by a downlink synchronization code and midamble code correlation value detecting module 13. Alternatively, the normalizations for $c_s^{(n)}$, $c_m^{(n)}$ can be performed by a separate normalization calculating unit (not shown in the drawing) provided between the downlink synchronization code and midamble code correlation value detecting module 13 and the downlink synchronization code correlation value detecting module 11 and the midamble code correlation value detecting module 12.

The downlink synchronization code and midamble code correlation value detecting module 13 finds cross-correlations of $c_s^{(n)}$, $c_m^{(n)}$ according to Equation 7 to obtain a phase shift between a downlink synchronization code of a received signal and a midamble code.

$$p_n = (\tilde{c}_s^{(n)})^T \cdot (\tilde{c}_m^{(n)})^* = (e^{j\phi_n} + \tilde{N}_s) \cdot (1 + \tilde{N}_m^*) \quad [\text{Equation 7}]$$
$$= e^{j\phi_n} + e^{j\phi_n} \cdot \tilde{N}_m^* + \tilde{N}_s + \tilde{N}_s \cdot \tilde{N}_m^*$$

Assuming that $\tilde{N}_m^*$ and $\tilde{N}_s$ are negligibly small values, it is able to calculate a phase shift $p_n$ between a downlink synchronization code of a received signal and a midamble code.

According to the above schemes, the phase detecting unit 10 calculates a phase shift between a downlink synchronization code included in each subframe and a midamble code and then outputs the calculated phase shift to the inner product calculating unit 20.

Figure 5:
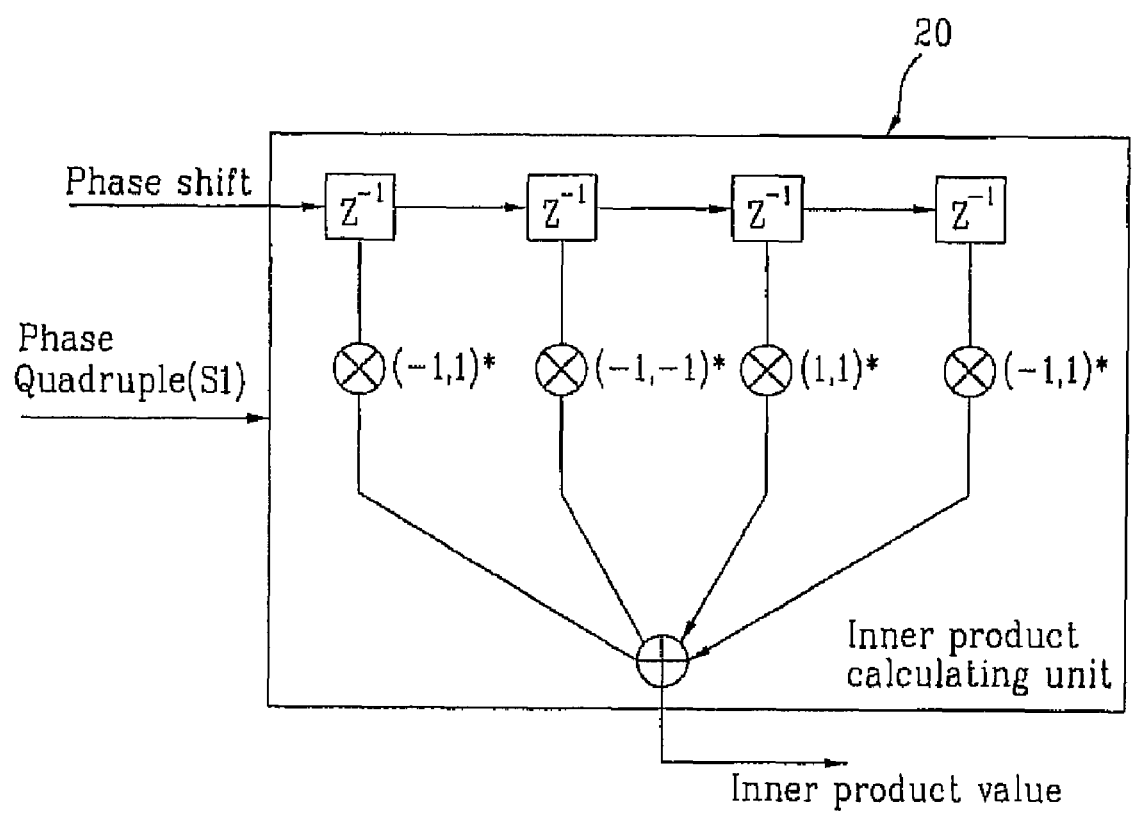

FIG. 5 is a detailed block diagram of the inner product calculating unit 20.

Referring to FIG. 5, the inner product calculating unit 20 finds a complex inner product of $q = [q_0, q_3]^T = [(-1,1), (1,1), (-1,1), (-1,1)]^T$, which is a coordinate expression in a vector form of 'phase quadruple' S1 (135°, 45°, 225°, 135°) and $P_n = [P_n, p_{n+3}]^T$ which is a vector expression of phase shifts of four consecutive subframes found by the phase estimating unit 10.

If the inner product value found by the inner product calculating unit 20 is normalized, it is able to obtain Equation 8.

$$M_n = \frac{P_n^T \cdot q^*}{\sqrt{2}} \quad [\text{Equation 8}]$$

The frame synchronization detecting unit 30 performs frame synchronization by comparing the calculated inner product value to a preset threshold value. A method of deciding the threshold value used by the frame synchronization detecting unit 30 is explained in detail as follows.

First of all, it is able to consider all cases that phase quadruples S1 and S2 are brought. Since frame synchronization is unknown, assuming that both of the S1 and the S2 can exist, a number of cases that can be provided to four consecutive phase shifts correspond to a total of 14 cases shown in Table 2.

For instance, 'S1+S2' indicates a case that 'S1' is followed by 'S2'. And, 'offset' in Table 2 indicates a frame synchronization error by subframe unit. Namely, when 'offset' is 1 in 'S1+S2', it represents four consecutive phase shifts including from a second phase shift of 'S1' to a first phase shift of 'S2'.

This is converted to coordinates in a vector form of the same phase having (1,−1) as an element each like the former 'q', a vector S1 and a complex inner product are found and normalized. If so, values shown in Table 2 can be provided.

TABLE 2

| case | offset | phase quadruple | Real of Inner Produc. | Imagin. of Inner Product | Absolute value of inner product |
|---|---|---|---|---|---|
| frame synchronization matched | | | | | |
| S1 | 0 | 135°, 45°, 225°, 135° | $4\sqrt{2}$ | 0 | $4\sqrt{2}$ |
| S2 | 0 | 315°, 225°, 315°, 45° | $-2\sqrt{2}$ | 0 | $2\sqrt{2}$ |
| frame synchronization not matched | | | | | |
| S1 + S2 | 1 | 45°, 225°, 135°, 315° | $-2\sqrt{2}$ | $-2\sqrt{2}$ | 4 |
|  | 2 | 225°, 135°, 315°, 225° | 0 | $4\sqrt{2}$ | $4\sqrt{2}$ |
|  | 3 | 135°, 315°, 225°, 315° | $\sqrt{2}$ | $-\sqrt{2}$ | 2 |
| S2 + S2 | 1 | 225°, 315°, 45°, 315° | $-2\sqrt{2}$ | 0 | $2\sqrt{2}$ |
|  | 2 | 315°, 45°, 315°, 225° | 0 | $2\sqrt{2}$ | $2\sqrt{2}$ |
|  | 3 | 45°, 315°, 225°, 315° | 0 | $-2\sqrt{2}$ | $2\sqrt{2}$ |
| S1 + S1 | 1 | 45°, 225°, 135°, 135° | 0 | $-2\sqrt{2}$ | $2\sqrt{2}$ |
|  | 2 | 225°, 135°, 135°, 45° | 0 | 0 | 0 |
|  | 3 | 135°, 135°, 45°, 225° | 0 | $2\sqrt{2}$ | $2\sqrt{2}$ |
| S2 + S1 | 1 | 225°, 315°, 45°, 135° | 0 | 0 | 0 |
|  | 2 | 315°, 45°, 135°, 45° | 0 | $-2\sqrt{2}$ | $2\sqrt{2}$ |
|  | 3 | 45°, 135°, 45°, 225° | $-\sqrt{2}$ | $\sqrt{2}$ | 2 |

Referring to Table 2, the real part of the inner product has a biggest value of $4\sqrt{2}$ in case of 'S1'. And, a second biggest value is $\sqrt{2}$. Hence, it is able to decide a random value existing between $\sqrt{2}$ and $4\sqrt{2}$ as a threshold value. In particular, since a level of a substantially received signal is variable according to noise and fading, $$\frac{(4\sqrt{2} + \sqrt{2})}{2}$$

can be decided as the threshold value by maximum likelihood detection. If a size of the real part is equal to or greater than $$\frac{(4\sqrt{2} + \sqrt{2})}{2},$$

it can be regarded as the S1 has been received.

In some cases, if there exists a phase quadruple different from the phase quadruple S1 or S2 in the 3GPP TDD LCR system, it is also able to decide the threshold value using an imaginary part of inner product.

Meanwhile, if a frequency offset exists, a phase shift occurs between a downlink synchronization code and a midamble code not by a phase quadruple but by the frequency offset. In case that a frequency offset varies according to time as AFC (auto frequency control) is activated, a detected phase shift can occur differently in each subframe. In this case, the frequency offset means a frequency difference between a local oscillator of a base station and UE or a frequency difference generated by Doppler frequency effect in channel and the like. Moreover, since the frequency offset brings about a sampling error in UE or considerably degrades reception performance by being accumulated according to time, the UE compensates for the frequency offset continuously by detecting the frequency offset through AFC.

So, in case that the frame synchronization detecting unit 30 performs frame synchronization, it is preferable that a threshold value is set different according to a presence or non-presence or size of a frequency offset and/or that the calculated inner product value is differently applied to the comparison with the set threshold value.

For instance, if a frequency offset detected by a UE is smaller than a reference value, frame synchronization can be detected by comparing a first threshold value to a real part of the calculated inner product value. If the detected frequency offset is greater than the reference value, frame synchronization can be detected by comparing a second threshold value to an absolute value of the calculated inner product value.

In case that a frequency offset exists, an absolute value of inner product is preferably used since it is unable to decide a presence or non-presence of reception of S1 with the real part of the inner product value according to the former method. This is explained in detail as follows.

Referring to Table 2, since an absolute value of inner product is $4\sqrt{2}$ in case that S1 is received. Otherwise, a maximum value is 4. Like the case of using the real part of inner product, it is able to decide $$\frac{(4\sqrt{2} + 4)}{2}$$

as a threshold value by maximum likelihood detection. Hence, it can be regarded as the S1 is received for the case that an absolute value of inner product is equal to or greater than $$\frac{(4\sqrt{2} + 4)}{2}.$$

Yet, in case that phase quadruples S1 and S2 exist like the 3GPP TDD LCR system, even if synchronization with S1 is not matched, an absolute value $4\sqrt{2}$ of inner product can be generated like the case of receiving the S1. And, it may be incorrectly decided that the S1 is received due to noise and fading in case that an absolute value of inner product is 4. In this case, in addition to using an absolute value of inner product, it is able to decide a presence or non-presence of S1 reception more accurately in a manner of using either a phase value $p_{n-1}$ received right before or a phase value of quadruple, e.g., a phase shift of a first value $p_n$.

Referring to Table 2, for a case of receiving S1 and a case of incorrectly deciding that S1 is received if an absolute value of inner product is $4\sqrt{2}$ or 4 and if S1 synchronization is not matched, a right-before phase quadruple and a currently received phase quadruple are explained as follows.

(1) Case of Receiving S1

Case that S1 is followed by S1: (135°, 45°, 225°, 135°), (135°, 45°, 225°, 135°)

Case that S2 is followed by S1: (315°, 225°, 315°, 45°), (135°, 45°, 225°, 135°)

(2) Case that Synchronization is not Matched with S1

Case of S1+S2, Offset 1: (225°, 315°, 45°, 135°), (45°, 225°, 135°, 315°)

Case of S1+S2, Offset 2: (315°, 45°, 135°, 45°), (225°, 135°, 315°, 225°)

Figure 6:
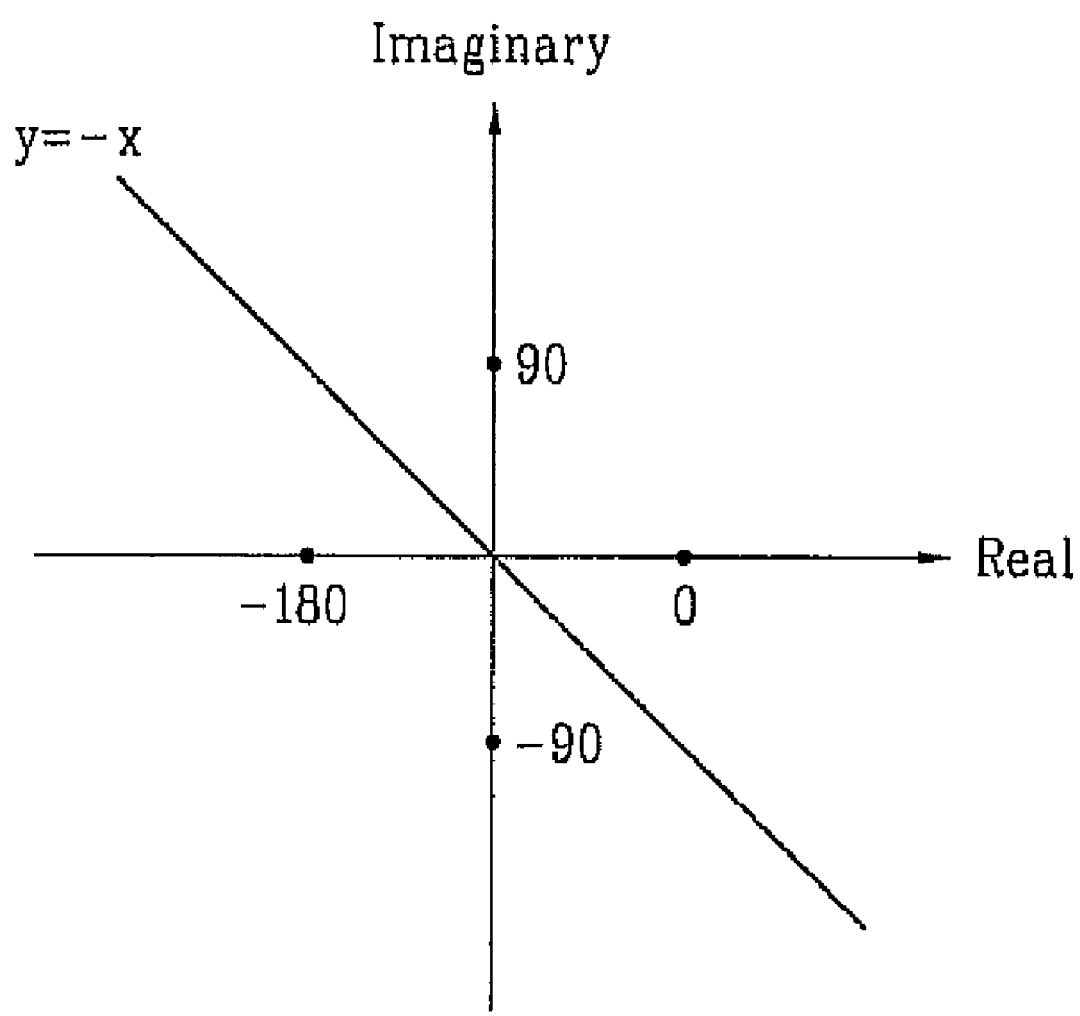
FIG. 6 is a graph of a complex plane.

In case that S1 is received, it may happen that S1 or S2 is received in advance. In this case, a phase shift between a right-before received phase value $P_{n-1}$ and a first value $P_n$ of quadruple is 0° or 90°. On the other hand, in case that S1 synchronization is not matched, the corresponding phase shift is −90° or 180°. If the phase shifts are represented in a complex plane shown in FIG. 6, an area for deciding a case of receiving S1 and a case of not receiving S1 can be defined by a straight line represented as y=−x. Accordingly, a decision of a presence or non-presence of S1 can be executed in a following manner.

$$M'_n(p_{n-1}, p_n) = Re[p_n p_{n-1}^*] + Im[p_n p_{n-1}^*]$$ [Equation 9]

If Equation 9 indicates a positive number, it is the case that S1 is received. If Equation 9 indicates a negative number, it is the case that S1 synchronization is not matched.

The above-explained frame synchronization estimating apparatus according to one embodiment of the present invention can be implemented within a user equipment (UE). Meanwhile, if a frequency offset is temporally varied by compensation for the offset according to AFC, a phase shift estimated in each subframe may be differently degenerated. Preferably, by stopping the frequency offset compensation function according to AFC in the course of frame synchronization estimation, the estimated phase shift is prevented from being differently generated in each subframe.

When the frame synchronization detecting unit 30 performs frame synchronization, it is preferable that a threshold value is set different according to a frequency offset to be compared to the calculated inner product value. In particular, a UE detects a frequency offset. If the detected frequency offset is smaller than a reference value, frame synchronization is detected by comparing a first threshold value to a real part of the calculated inner product value. If the detected frequency offset is greater than the reference value, frame synchronization is detected by comparing a second threshold value to an absolute value of the calculated inner product value.

Figure 7:
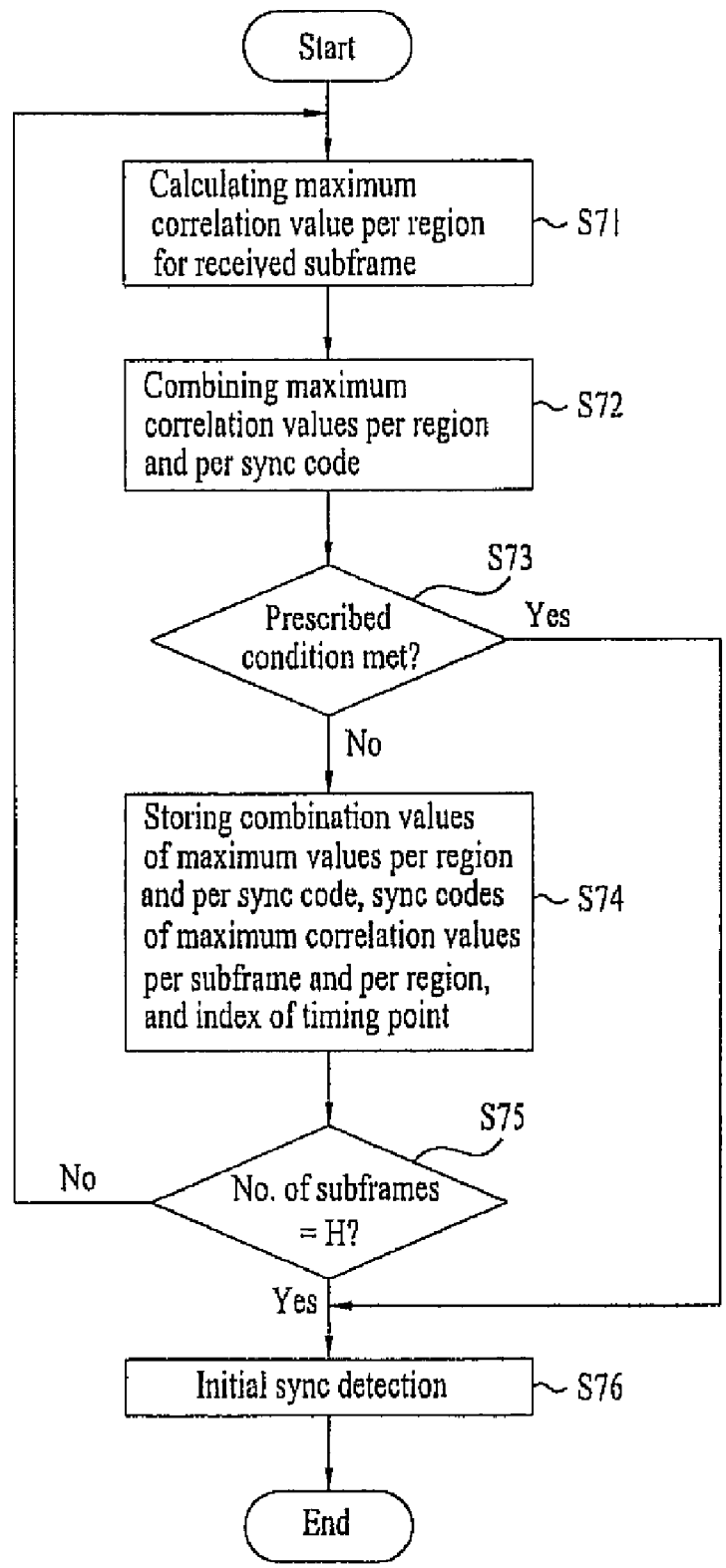
FIG. 7 is a flowchart of a method of performing initial synchronization according to another preferred embodiment of the present invention.

FIG. 7 is a flowchart of a method of performing initial synchronization according to another preferred embodiment of the present invention.

Referring to FIG. 7, a UE divides one subframe received from a base station into a plurality of regions, finds correlations with 32 downlink synchronization codes for each of a plurality of the regions, and then calculates a correlation peak value for each region (S71). This step is explained in detail as follows.

First of all, in the 3GPP TDD-LCR system, SYNC-DL codes are used as downlink synchronization codes and they use 32 kinds of sequences. In an initial cell search process, the UE searches DwPTS within the subframe shown in FIG. 2 without information for a cell to be searched and timing information.

Figure 8:
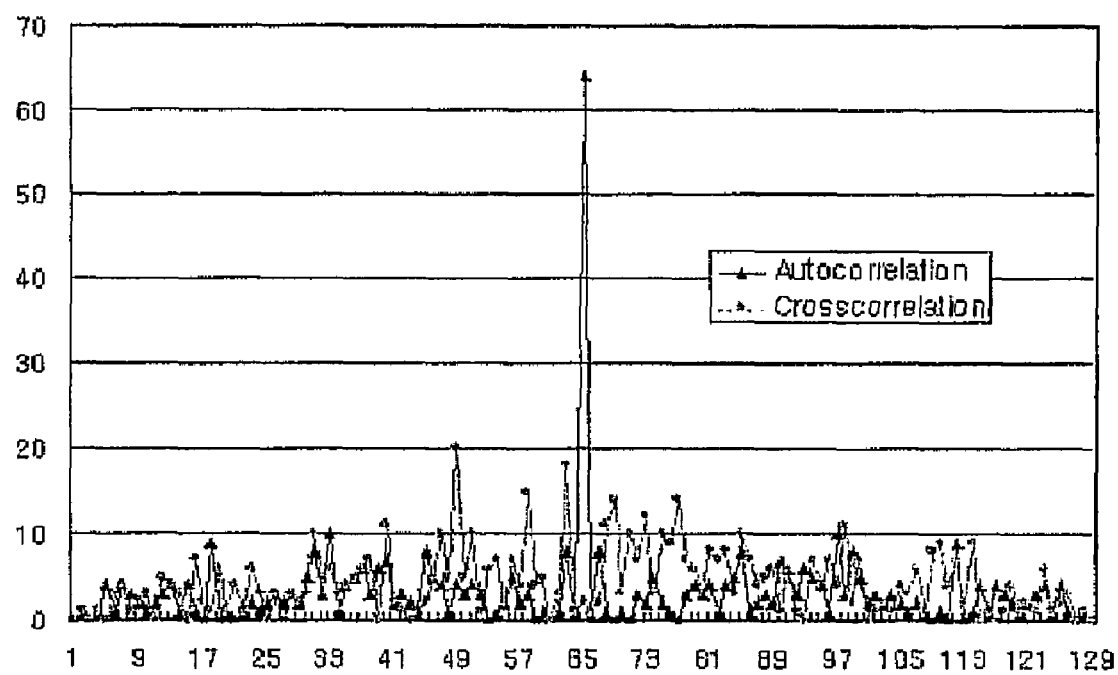
FIG. 8 is an exemplary diagram of auto-correlation for SYNC-DL code and cross-correlation with another code.

FIG. 8 is an exemplary diagram of auto-correlation for SYNC-DL code and cross-correlation with another code. In FIG. 8, a peak point corresponds to a part having a high correlation in a received signal.

In general, a received signal $\{r\} = (r_0, r_1, \ldots)$ is received in a manner of being over-sampled over a chip rate. An $I^{th}$ SYNC-DL code is represented as $\{S_{(I)} = (s_0^{(I)}, s_1^{(I)}, \ldots, s_{63}^{(I)})\}$.

In this case, '0≦I<32' is a QPSK symbol and is an index for SYNC-DL codes. A correlation between a received signal and an $I^{th}$ SYNC-DL code can be defined by Equation 10.

$$c_i^{(I)} = \left| \sum_{j=0}^{63} r_{i+j}^* \cdot s_j^{(I)} \right|$$ [Equation 10]

So, a downlink synchronization code having a correlation peak value in each region and a corresponding position information $P^{(l,i)}$ can be found by maximum likelihood detection like Equation 11.

$$c_{\hat{i}}^{(\hat{l})} = \max_{0 \leq i < R} \{\max_{0 \leq l < 32} \{c_i^{(l)}\}\}$$ [Equation 11]

Figure 9:
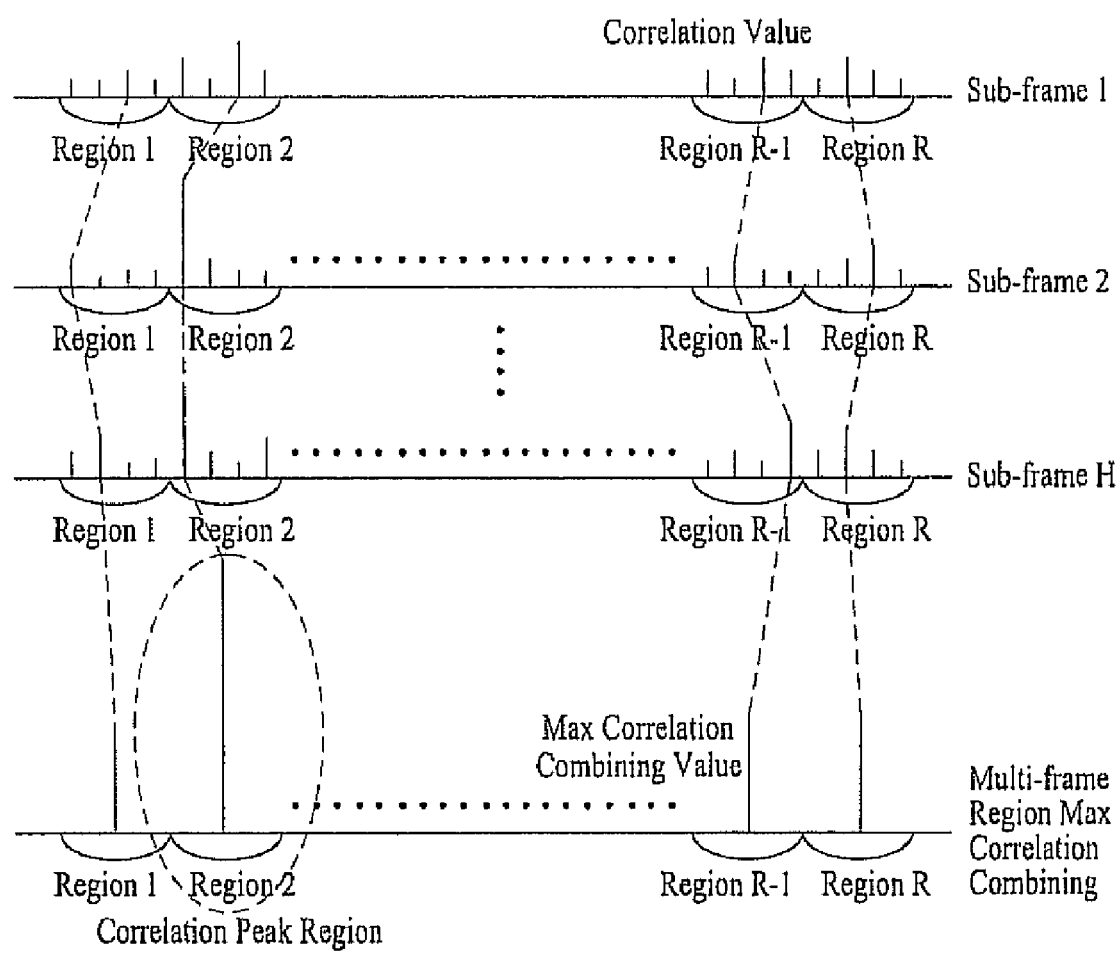
FIG. 9 is a diagram of a process for finding a maximum value of correlation for each area, a synchronization code having the maximum value and an index of a timing point according to one preferred embodiment of the present invention.

In Equation 11, $\hat{l}$ and $\hat{i}$ indicate a SYNC-DL code having a correlation peak value and an detected value for a point having the correlation peak value in a corresponding region, respectively. And, 'R' indicates a size of region. The above step is repeated within one subframe to find the maximum value of the correlation for each region, a synchronization code having the maximum value and an index of a timing point, which is shown in FIG. 9.

Preferably, the step S71 is repeated for at least two subframes. For subframes after the second, correlation peak values are obtained per region and per synchronization code and the correlation peak values per region and per synchronization code up to a corresponding subframe are then added to be combined together (S72). After the correlation peak values per region and per synchronization code up to a corresponding subframe have been added and combined together, it is checked whether a prescribed condition is met (S73).

The prescribed condition is met if a difference between a biggest value and a second biggest value among the values resulting from combining the correlation peak values per region and per synchronization code is equal to or greater than a preset threshold value. In other words, if the biggest value or the second biggest value among the combined values of the correlation peak values is equal to or greater than the preset threshold value, there is almost no possibility in tracking incorrect information. And, initial synchronization at that timing point is detected without observing several frames anymore (S76). Besides, it is able to apply the prescribed condition to a first subframe only. And, it is able to skip the step S73.

If the prescribed condition is not met, the UE stores the combined value of the correlation peak values per region and per synchronization code up to the corresponding subframe, the synchronization code having the correlation peak value per subframe and per region and the index of the timing point (S74).

Subsequently, it is checked whether a number of subframes for finding the correlation peak value per region is a preset value H (S75). If the number of the subframes is smaller than H, steps starting from the step S71 are repeated for a next subframe. If the number of the subframes matches H, initial synchronization is performed using the values stored so far (S76). In this case, 'H' can be selected within a range that can guarantee accuracy of initial synchronization detection.

In case of receiving H subframes, the former Equations relating to the aforementioned correlations can be redefined as Equation 12.

$$c_{i,h}^{(l)} = \sum_{j=0}^{63} r^*_{(i+hn6400)+j} \cdot s_j^{(l)} \quad \text{[Equation 12]}$$

In this case, it is assumed that $0 \leq h < H$, $0 \leq i < 6400$ and that a received signal is over-sampled n-times.

A total of correlation peak values in one region for H subframes can be defined as Equation 13.

$$c_i^{(l)} = \sum_{h=0}^{H-1} \max_{0 \leq i < R} \{\max_{0 \leq l < 32} \{c_i^{(l)}\}\} \quad \text{[Equation 13]}$$

If the prescribed condition is met in the step S73 or if the number of the subframes corresponds to H in the step S75, initial synchronization is estimated using a combined value of correlation peak values per region and per synchronization code so far (S76). In this case, the initial synchronization estimation means that an index of a downlink synchronization code used in a UE-located cell and an index of a timing synchronization point are estimated.

An index of a synchronization code corresponding to a biggest value among the combined values of the correlation peak values per region and per synchronization code is selected as the downlink synchronization code. The index of the timing synchronization point can be detected within a region corresponding to the biggest value among the combined values of the correlation peak values in various ways by the following methods. Besides, the timing synchronization point can be detected in other ways as well.

Figure 10:
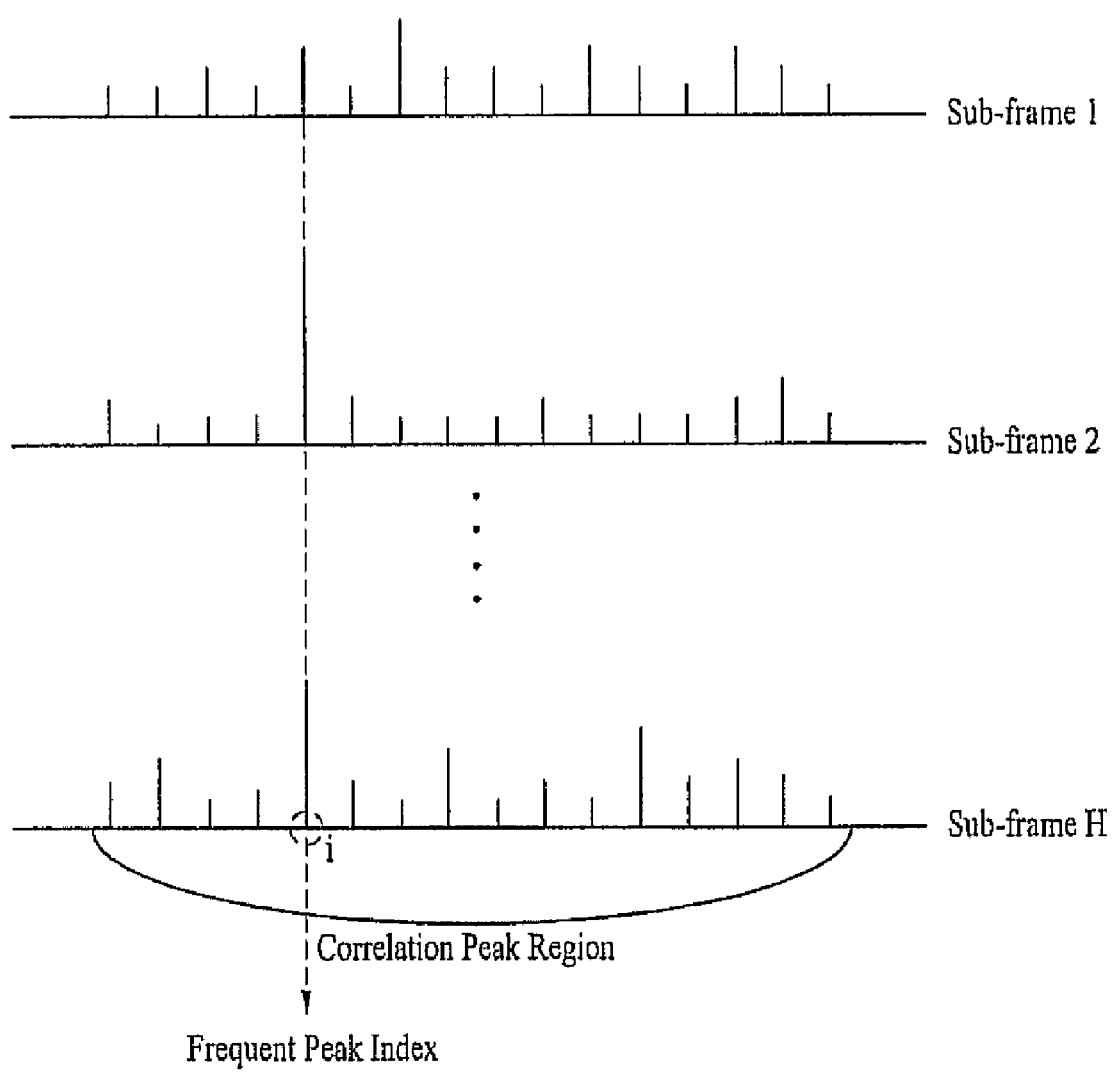
FIG. 10 is a diagram of an example for detecting a timing synchronization point according to one preferred embodiment of the present invention.

In a first method, an index of a timing point, at which a correlation peak value of the selected synchronization code is most frequently outputted within a region corresponding to a biggest value among combined values of correlation peak values, is decided as an index of the timing synchronization point. FIG. 10 is a diagram to explain the first method. Since a point-i is the point at which the correlation peak value is most frequently outputted within the region corresponding to the biggest value among the combined values of the correlation peak values, the corresponding point is detected as the timing synchronization point.

In a second method, an average of indexes of timing points of correlation peak values of the selected synchronization code within a region corresponding to a biggest value among combined values of correlation peak values is found. The average is then selected as an index of the timing synchronization point.

In a third method, by giving weight to timing point indices of correlation peak values of the selected synchronization code within a region corresponding to a biggest value among combined values of correlation peak values according to a frequency of a correlation peak value, a weighted average value is found. And, the weighted average value is decided as an index of the timing synchronization point.

Figure 11:
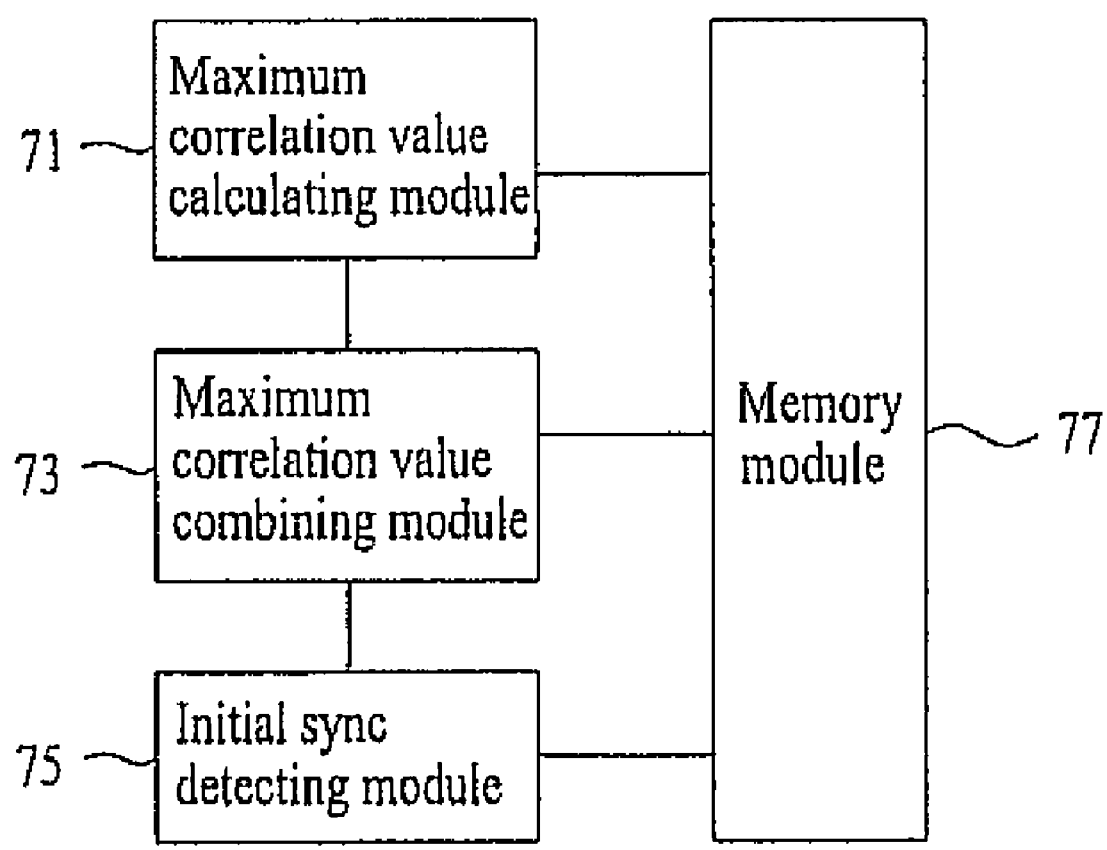
FIG. 11 is a block diagram of an apparatus for performing initial synchronization according to one preferred embodiment of the present invention.

FIG. 11 is a block diagram of an apparatus for performing initial synchronization according to one preferred embodiment of the present invention. Since the present invention relates to initial synchronization in a user equipment of a mobile communications system, the apparatus shown in FIG. 11 can be substantially implemented within the user equipment.

Referring to FIG. 11, an apparatus for performing initial synchronization according to one preferred embodiment of the present invention includes a correlation peak value calculating unit 71 dividing at least one subframe received from a base station into at least two regions and calculating a correlation peak value with a downlink synchronization code for each of the at least two regions, a correlation peak value combining module 73 combining the correlation peak values per the region and per the downlink synchronization code together, an initial synchronization detecting module 75 performing initial synchronization using the combined values of the correlation peak values, and a memory module 77 storing the combined value of the correlation peak values per the region and per the downlink synchronization code and an index of a point having the correlation peak value per the region and per the downlink synchronization code.

Since functions of the respective modules have been explained in the foregoing description, their detailed explanations are omitted in the following description. And, implementations of the respective elements shown in FIG. 11 are facilitated by software, hardware or combination of software and hardware.

Figure 12:
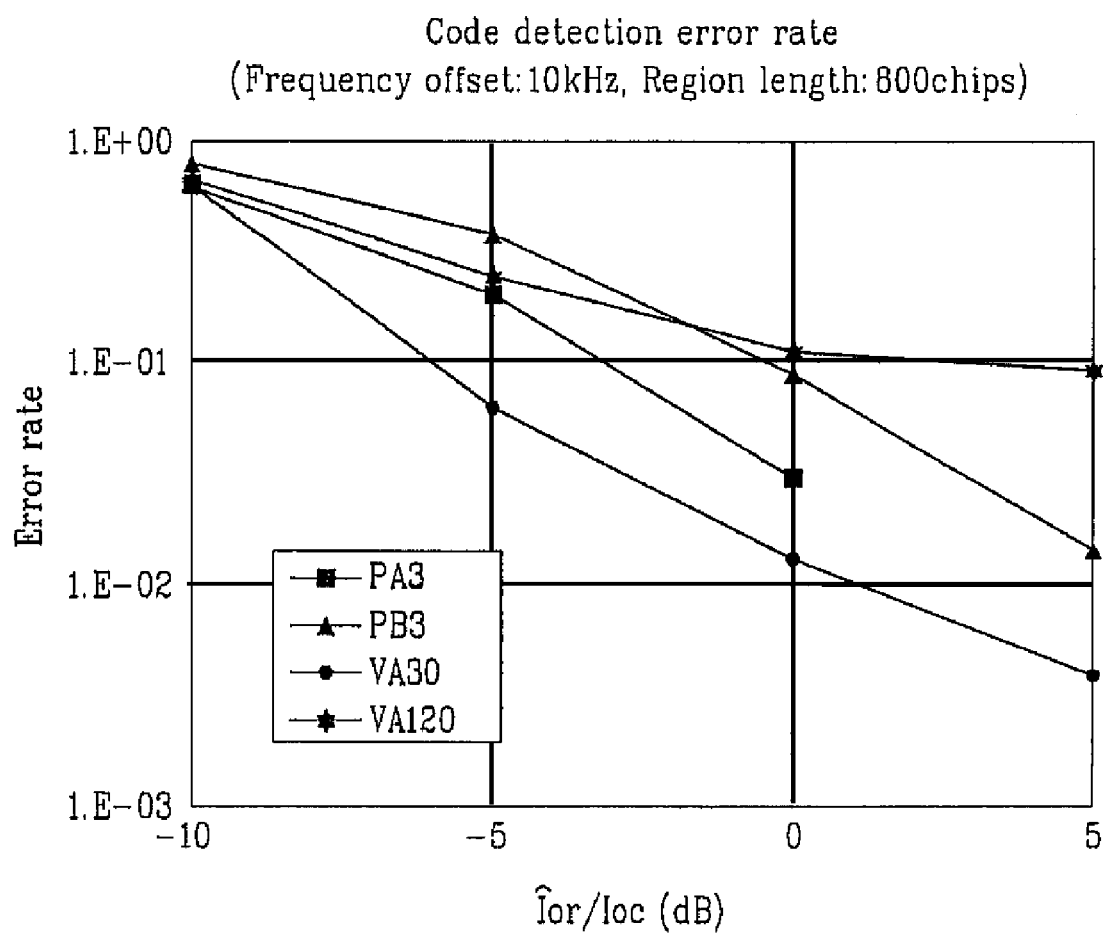
FIG. 12 is a graph of a simulation result for a case that various channels and frequency offsets exist.
Figure 13A:
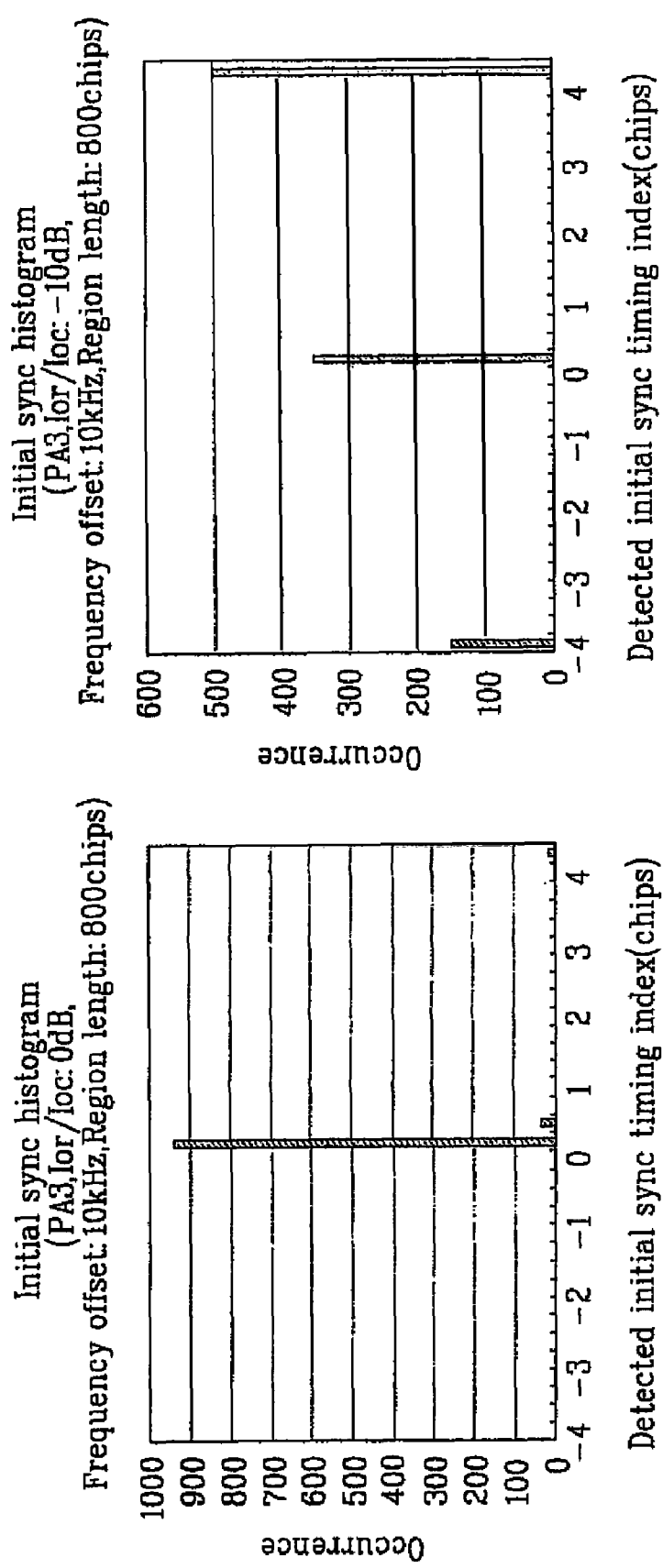
FIGS. 13A to 13D are initial synchronization histograms according to variations of SNR for various channels (PA3, PB3, VA30, VA120), respectively.
Figure 13B:
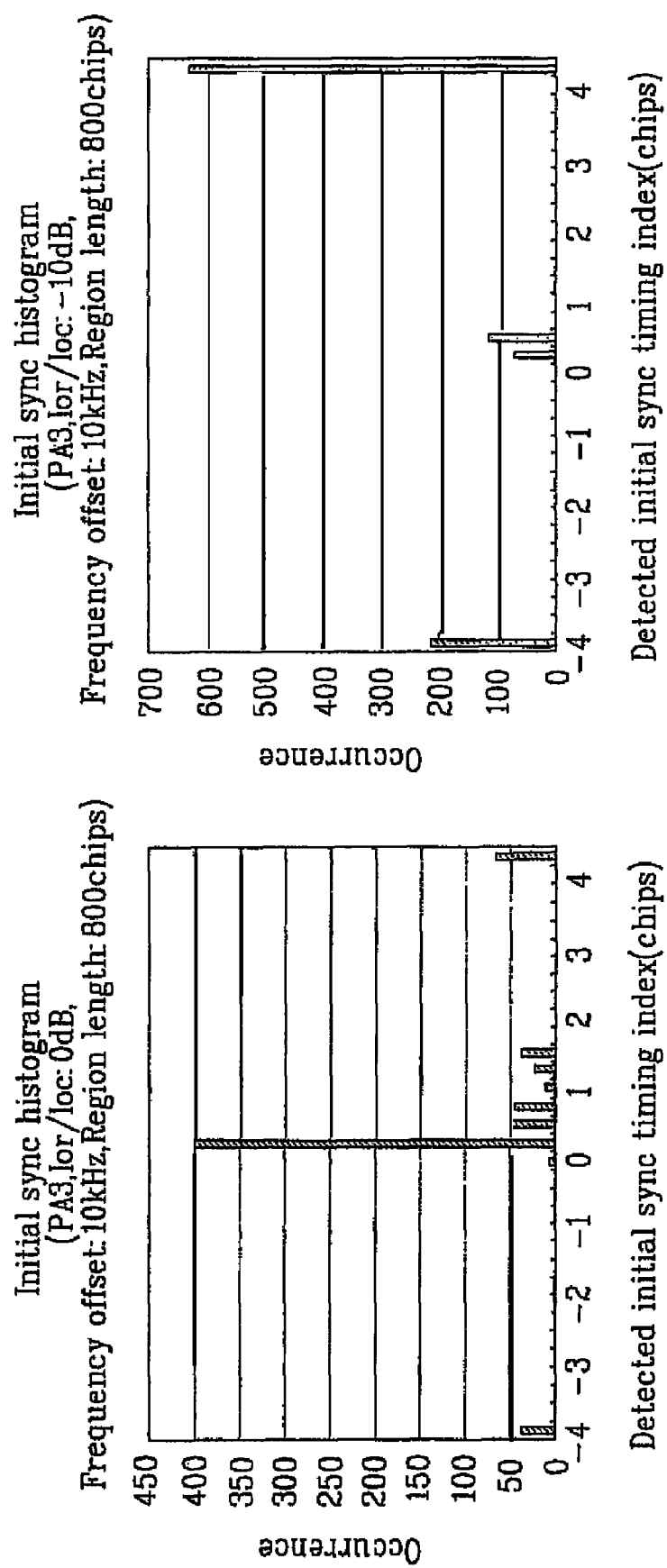
Figure 13C:
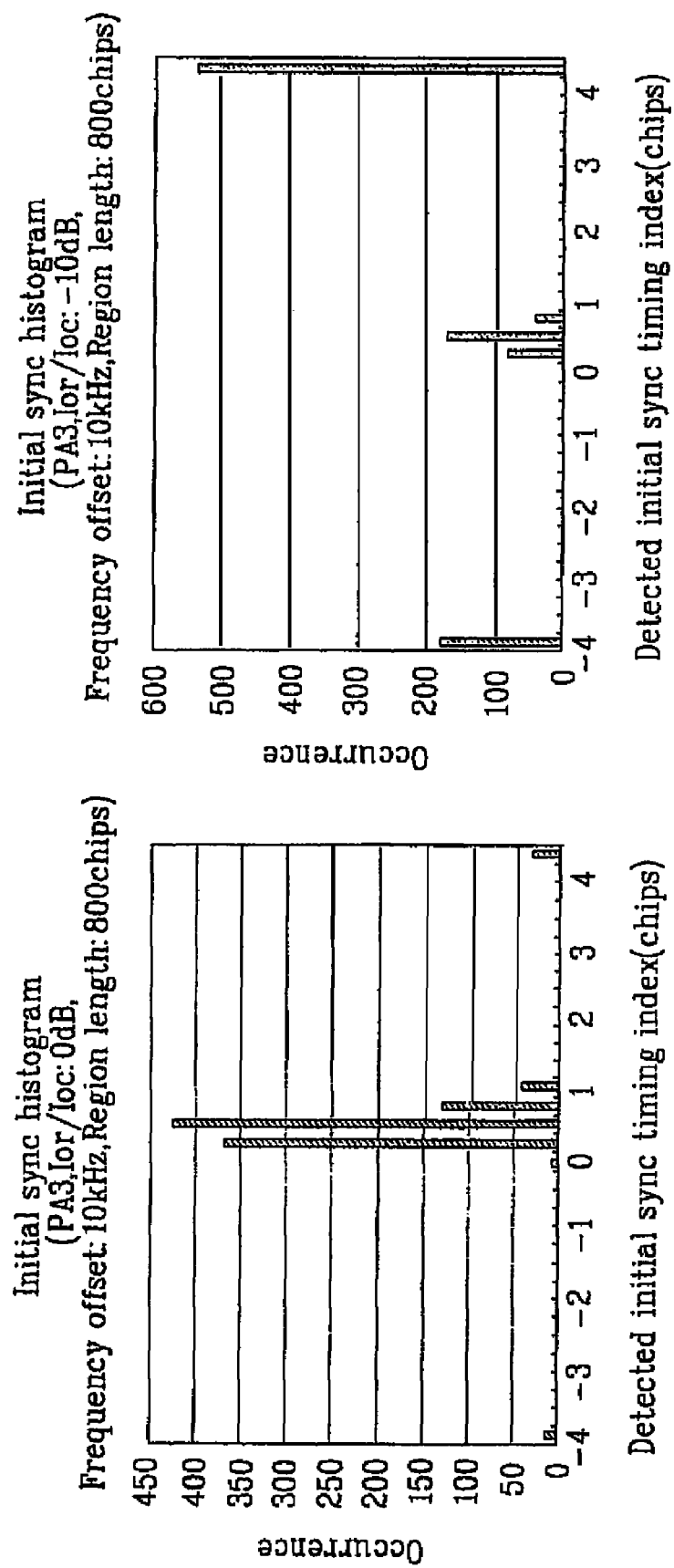
Figure 13D:
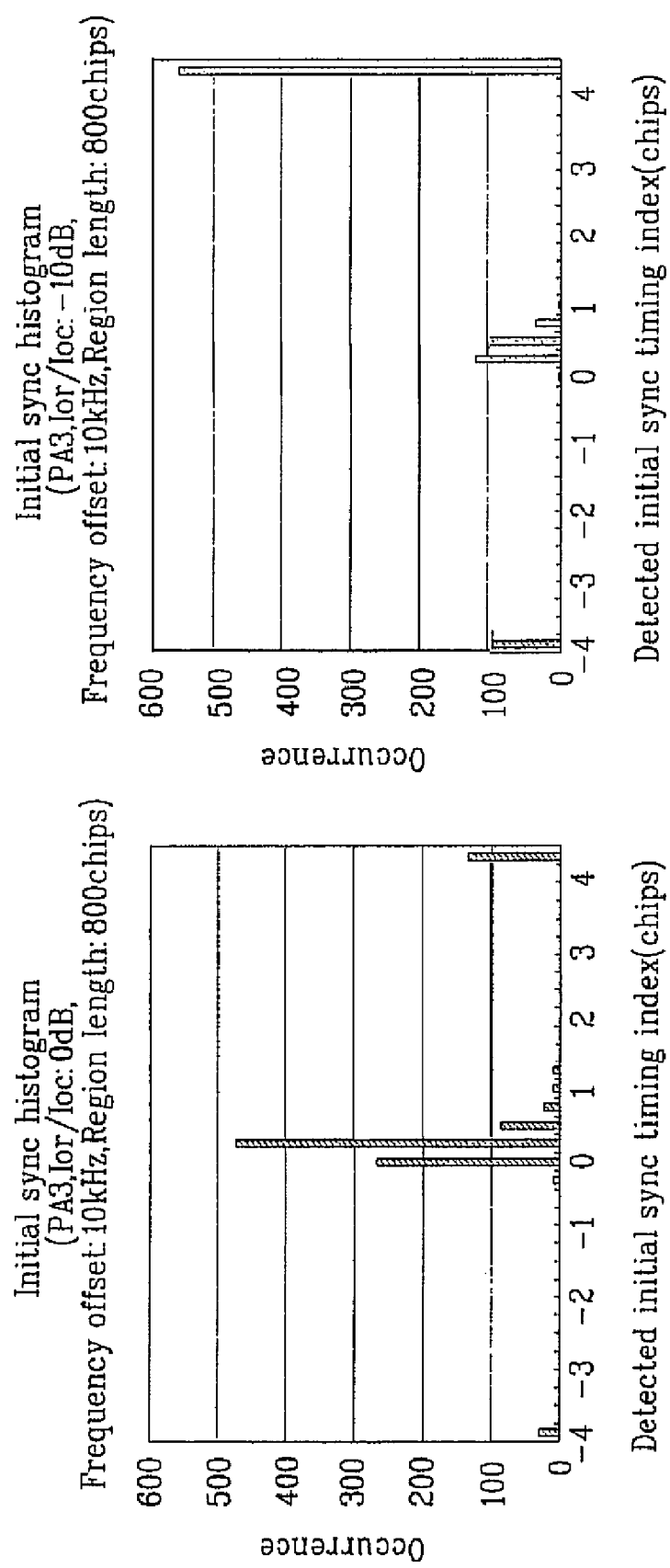

FIG. 12 is a graph of a simulation result for a case that various channels and frequency offsets shown in Table 3 exist.

Referring to FIG. 12, SYNC-DL code detection error rates according to SNR variation for various channels are shown. PA3 channel shows the best performance, while VA120 channel shows the worst performance.

TABLE 3

| ITU Pedestrian-A speed 3 km/h (PA3) | | ITU pedestrian-A Speed 3 km/h (PB3) | | ITU vehicular-A speed 30 km/h (VA30) | | ITU vehicular-A speed 120 km/h (VA120) | |
|---|---|---|---|---|---|---|---|
| Relative Delay [ns] | Relative Mean Power [dB] | Relative Delay [ns] | Relative Mean Power [dB] | Relative Delay [ns] | Relative Mean Power [dB] | Relative Delay [ns] | Relative Mean Power [dB] |
| 0 | 0 | 0 | 0 | 0 | 0 | 0 | 0 |
| 110 | −9.7 | 200 | −0.9 | 310 | −1.0 | 310 | −1.0 |
| 190 | −19.2 | 800 | −4.9 | 710 | −9.0 | 710 | −9.0 |
| 410 | −22.8 | 1200 | −8.0 | 1090 | −10.0 | 1090 | −10.0 |
|  |  | 2300 | −7.8 | 1730 | −15.0 | 1730 | −15.0 |
|  |  | 3700 | −23.9 | 2510 | −20 | 2510 | −20 |

FIGS. 13A to 13D are initial synchronization histograms according to variations of SNR for various channels (PA3, PB3, VA30, VA120) like Table 3, respectively. Referring to FIGS. 13A to 13D, '0' indicates a case that an accurate synchronization point is found. And, it is decided that error is acceptable within ±4 chips. Values within one chip interval are indicated by an over-sampling unit. '<−4' or '4<' indicates a case that a synchronization point is found beyond ±4 chips and it is decided as initial synchronization error. Hence, it can be seen that performance becomes degraded as SNR gets lowered.

Detected initial estimation is used as a reference synchronization point of a time tracker, AFC (automatic frequency control) or AGC (automatic gain control) as well as frame synchronization, it is important to find accurate initial synchronization.

Accordingly, the present invention provides the following effects or advantages. First of all, since correlation peak values per region are totaled for several subframes, it is enough to store correlation values amounting to a number of regions. Hence, compared to the method of storing all correlation values within one subframe, the present invention is able to prevent the memory increase. Secondly, the present invention is able to obtain initial synchronization having high reliability with frames less than those of the method of storing one correlation peak value for one subframe.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of performing downlink frame synchronization in a mobile terminal of a mobile communication system, the method comprising:
   obtaining phase shift values, wherein each of the phase shift values are obtained between a downlink synchronization code and a midamble code included in each of M number of consecutive subframes received from a base station;
   calculating a complex inner product between a reference vector representing M number of reference phase values and a phase vector representing M number of the obtained phase shift values;
   detecting a frequency offset between the base station and the mobile terminal; and
   performing the frame synchronization using the calculated complex inner product,
   wherein the frame synchronization is performed in accordance with a result of comparing a real part of the calculated complex inner product and a predetermined threshold value if the frequency offset is equal to or lesser than a reference value, and
   wherein the frame synchronization is performed using an imaginary part of the calculated complex inner product if the frequency offset is greater than the reference value.

2. The method of claim 1, wherein the frame synchronization is performed on an assumption that the phase shift values represented by the phase vector are identical to the reference phase values represented by the reference vector if the real part of the calculated complex inner product is equal to or greater than the threshold value.

3. The method of claim 1, wherein the frame synchronization is further performed using a phase shift value between a downlink synchronization code and a midamble code included in a subframe received right before the M number of consecutive subframes and a phase shift value between a downlink synchronization code and a midamble code included in one of the M number of the consecutive subframes.

4. An apparatus for performing frame synchronization in a mobile communication system, the apparatus comprising:
   a phase detection module obtaining a phase shift value between a downlink synchronization code and a midamble code included in a subframe;
   an inner product calculation module calculating a complex inner product between a reference vector representing M number of reference phase values and a phase vector representing M number of phase shift values obtained for each of M number of consecutive subframes by the phase detection module;
   a frequency offset detection module detecting a frequency offset between the base station and the mobile terminal; and
   a frame synchronization detection module performing the frame synchronization using the calculated complex inner product,
   wherein the frame synchronization is performed in accordance with a result of comparing a real part of the calculated complex inner product and a predetermined threshold value if the detected frequency offset is equal to or lesser than a reference value, and
   wherein the frame synchronization is performed using an imaginary part of the calculated complex inner product if the frequency offset is greater than the reference value.

5. The apparatus of claim 4, wherein the frame synchronization is performed on an assumption that the phase shift values represented by the phase vector are identical to the phase values represented by the reference vector if the real part of the calculated complex inner product is equal to or greater than the threshold value.

6. The apparatus of claim 4, wherein the frame synchronization detection module performs the frame synchronization using a phase shift value between a downlink synchronization code and a midamble code included in a subframe received right before the M number of consecutive sub-frames and a phase shift value between a downlink synchronization code and a midamble code included in one of the M number of the consecutive subframes.

* * * * *